(12) United States Patent
Baba et al.

(10) Patent No.: US 8,305,176 B2
(45) Date of Patent: Nov. 6, 2012

(54) ELECTROMAGNETIC ACTUATOR

(75) Inventors: Kazuhikio Baba, Tokyo (JP); Hitoshi Kawaguchi, Tokyo (JP); Toyoshi Nomura, Tokyo (JP); Kazuhiro Nakane, Shizuoka (JP); Nobuo Kojima, Shizuoka (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 165 days.

(21) Appl. No.: 12/674,214

(22) PCT Filed: Sep. 26, 2007

(86) PCT No.: PCT/JP2007/068615
§ 371 (c)(1),
(2), (4) Date: Feb. 19, 2010

(87) PCT Pub. No.: WO2009/040891
PCT Pub. Date: Apr. 2, 2009

(65) Prior Publication Data
US 2011/0128103 A1 Jun. 2, 2011

(51) Int. Cl.
*H01F 7/08* (2006.01)
(52) U.S. Cl. .................................. 335/260; 335/220
(58) Field of Classification Search .................. 335/220, 335/260, 221–229; 251/129.1–129.22
See application file for complete search history.

(56) References Cited

U.S. PATENT DOCUMENTS 5,339,063 A * 8/1994 Pham ........................... 335/260
5,926,082 A * 7/1999 Coleman et al. ............. 335/260
6,310,533 B2 * 10/2001 Coulombier ................. 336/90
6,758,416 B2 * 7/2004 Earhart et al. .............. 239/533.2
(Continued)

FOREIGN PATENT DOCUMENTS
JP 4-208504 A 7/1992
(Continued)

OTHER PUBLICATIONS

International Search Report of Application PCT/JP2007/068615 dated Nov. 13, 2007.

*Primary Examiner* — Bernard Rojas
(74) *Attorney, Agent, or Firm* — Buchanan Ingersoll & Rooney PC

(57) ABSTRACT

An object is to provide an electromagnetic actuator that is highly resistant to corrosion and also capable of having high suction power, even in a condition where part of the electromagnetic actuator touches a corrosive liquid. An electromagnetic actuator 50 according to this invention is incorporated into a device using a corrosive liquid 17. The electromagnetic actuator 50 is characterized by including a magnetic pole piece 1; an outer yoke 6; a bottom yoke 5; a bobbin coil 2; a stepped portion 6a that is formed on an outer surface of the outer yoke 6; a waterproof portion 8 that prevents the corrosive liquid 17 from entering at least where the bobbin coil 2 and the magnetic pole piece 1 are; a movable plate 12 that is placed in the corrosive liquid 17 to form a magnetic circuit together with the magnetic pole piece 1, the outer yoke 6, and the bottom yoke 5, The movable plate 12 is stored in a space 14 created either in the electromagnetic actuator 50 or between the device using the corrosive liquid 17 and the electromagnetic actuator 50. The outer yoke 6 is incorporated into the device using the corrosive liquid 17, on a reduced diameter side from the stepped portion 6a.

20 Claims, 6 Drawing Sheets

U.S. PATENT DOCUMENTS

| | | |
|---|---|---|
| 6,864,772 B2 * | 3/2005 | Callis et al. .................. 335/260 |
| 2009/0000740 A1 | 1/2009 | Kojima et al. |

FOREIGN PATENT DOCUMENTS

| JP | 5-121228 A | 5/1993 |
|---|---|---|
| JP | 6-295817 A | 10/1994 |
| JP | 2005-150308 A | 6/2005 |
| JP | 2005-277233 A | 10/2005 |
| JP | 2006-064053 A | 3/2006 |
| JP | 2006-193801 A | 7/2006 |

* cited by examiner

ELECTROMAGNETIC ACTUATOR

TECHNICAL FIELD

The present invention relates to an electromagnet that is used in a specific environment, such as in a corrosive liquid, and therefore requires resistance to corrosion.

BACKGROUND ART

An electromagnet, which is characterized by having a two-piece yoke to which a nonmagnetic substance is stuck fast and held, and forming a pair of magnetic poles, has been proposed (see, e.g., Patent Document 1). The electromagnet is designed to separate a coil portion from harmful surroundings, and also work as an electromagnetic by dividing the yoke into two portions with the nonmagnetic substance that is stuck fast and held.

A magnetic core, which forms a magnetic circuit in part of a magnetic path, has been proposed (see, e.g., Patent Document 2). The magnetic core consists of magnetic composite material portions and a high magnetic flux density material portion. The magnetic composite material portions are formed of magnetic composite materials that are placed on both end sides of the magnetic circuit. The high magnetic flux density material portion is formed of a high magnetic flux density material having a higher magnetic flux density and a lower specific resistance than those of the magnetic composite material portions. The high magnetic flux density material portion is tightly sandwiched between the magnetic composite material portions in the direction of the magnetic path of the magnetic circuit.

A plunger, which includes a coil bobbin, a coil, and a yoke, and in which a resin is poured between the yoke and the coil bobbin applied with the coil, has been proposed (see, e.g., Patent Document 3). The plunger is formed as follows: The diameter W2 of a second flange is set smaller than the diameter W1 of a first flange (W1>W2). The second flange is disposed on an open end side of the yoke, and the coil is wound between the first and second flanges in a tapered shape.

An electromagnetic device having high gain and high phase frequency characteristic that is used for an actuator such as a magnetic bearing device has been proposed (see, e.g., Patent Document 4). The electromagnetic device is provided with a stainless steel that surrounds the magnetic yoke supporting a target object by magnetic attraction without touching it.

Patent Document 1: Unexamined Japanese Patent Publication No. Hei 4-208504 (see FIG. 1)
Patent Document 2: Unexamined Japanese Patent Publication No. 2005-150308 (see FIG. 1)
Patent Document 3: Unexamined Japanese Patent Publication No. Hei 6-295817 (see FIG. 1)
Patent Document 4: Unexamined Japanese Patent Publication No. Hei 5421228 (see FIG. 1)

DISCLOSURE OF THE INVENTION

When used in a corrosive liquid environment, however, the conventional electromagnetic actuators disclosed in Patent Documents 1-4 are not sufficient enough in terms of waterproof and corrosion resistance.

This invention is directed to solve problems like this. It is an object to provide an electromagnetic actuator that is highly resistant to corrosion and also capable of having high suction power, even in a condition where part of the electromagnetic actuator touches a corrosive liquid.

Means to Solve Problems

An electromagnetic actuator according to this invention may be incorporated into a device using a corrosive liquid. The electromagnetic actuator may be characterized by including: a magnetic pole piece in a shape of a pillar; an outer yoke in a shape of a tube that is corrosion resistant, and that is placed around a periphery of the magnetic pole piece; a bottom yoke that connects the magnetic pole piece and one end portion of the outer yoke; a bobbin coil that is attached to the magnetic pole piece, the bobbin coil including a first coil holding portion, and a second coil holding portion on a bottom yoke side; a stepped portion that is formed on an outer surface of the outer yoke to make a diameter on an opposite side to the bottom yoke smaller than a diameter on the bottom yoke side; a waterproof portion that prevents the corrosive liquid from entering at least where the bobbin coil and the magnetic pole piece are; a movable plate that is placed in the corrosive liquid to form a magnetic circuit together with the magnetic pole piece, the outer yoke, and the bottom yoke. The movable plate may be stored in a space created either in the electromagnetic actuator or between the device using the corrosive liquid and the electromagnetic actuator. The outer yoke may be incorporated into the device using the corrosive liquid, on a reduced diameter side from the stepped portion.

An electromagnetic actuator according to this invention may be characterized by including: a magnetic pole piece in a shape of a pillar; an outer yoke in a shape of a tube that is corrosion resistant, and that is placed around the periphery of the magnetic pole piece; a bottom yoke that connects the magnetic pole piece and one end portion of the outer yoke; a bobbin coil that is attached to the magnetic pole piece, the bobbin coil including a first coil holding portion, and a second coil holding portion on a bottom yoke side; a waterproof plate that is attached against an end portion of the magnetic pole piece on an opposite side to the bottom yoke, and formed to create a gap between the first coil holding portion and an inner surface of the outer yoke; a stepped portion that is formed on an outer surface of the outer yoke to make a diameter on the opposite side to the bottom yoke smaller than a diameter on the bottom yoke side; a movable plate storage cap in a shape of a cup that is fitted to the outer surface of the outer yoke on a reduced diameter side, attached against another end portion of the outer yoke to create a space between the waterproof plate and the movable plate storage cap, and formed to create an opening on a surface facing the waterproof plate; a movable plate that is placed in the space between the waterproof plate and the movable plate storage cap; and a resin that is filled in a gap formed between the outer yoke and the waterproof plate. The reduced diameter side from the stepped portion may be incorporated into the device using the corrosive liquid.

An electromagnetic actuator according to this invention may be characterized by including: a magnetic pole piece in a shape of a pillar; an outer yoke in a shape of a tube that is corrosion resistant, and that is placed around the periphery of the magnetic pole piece; a bottom yoke that connects the magnetic pole piece and one end portion of the outer yoke; a bobbin coil that is attached to the magnetic pole piece, the bobbin coil including a first coil holding portion, and a second coil holding portion on a bottom yoke side; a stepped portion that is formed on an outer surface of the outer yoke to make a diameter on an opposite side to the bottom yoke smaller than a diameter on the bottom yoke side; a waterproof cap in a shape of a cap that is fitted to the outer surface of the outer yoke on a reduced diameter side, and attached against another end portion of the outer yoke and an end portion of the magnetic pole piece on the opposite side to the bottom yoke; a movable plate storage cap in a shape of a cup that is fitted to an outer surface of the waterproof cap to create a space between the waterproof cap and the movable plate storage cap, and formed to create an opening on a surface facing the end portion of the magnetic pole piece on the opposite side to the bottom yoke; and a movable plate that is placed in the space between the waterproof cap and the movable plate storage cap. The reduced diameter side from the stepped portion may be incorporated into the device using the corrosive liquid.

An electromagnetic actuator according to this invention may be characterized by including: a magnetic pole piece in a shape of a pillar; an outer yoke in a shape of a tube that is corrosion resistant, and that is placed around a periphery of the magnetic pole piece; a bottom yoke that connects the magnetic pole piece and one end portion of the outer yoke; a bobbin coil that is attached to the magnetic pole piece, the bobbin coil including a first coil holding portion, and a second coil holding portion on a bottom yoke side; a waterproof plate that is attached against an end portion of the magnetic pole piece on an opposite side to the bottom yoke, and formed to create a gap between the first coil holding portion and an inner surface of the outer yoke; a stepped portion that is formed on an outer surface of the outer yoke to make a diameter on the opposite side to the bottom yoke smaller than a diameter on the bottom yoke side; a rustproof cap in a shape of a cup that is fitted to the outer surface of the outer yoke on a reduced diameter side, and attached against another end portion of the outer yoke, and formed to include an opening whose diameter is approximately the same in size as an inside diameter of the outer yoke; and a movable plate. The reduced diameter side from the stepped portion may be incorporated into the device using the corrosive liquid. The movable plate may be stored in a space created in a lower portion of the waterproof plate between the device and the electromagnetic actuator.

The electromagnetic actuator according to this invention may be characterized in that the magnetic pole piece and the bottom yoke are formed of an iron material, and the outer yoke is formed of a stainless steal.

The electromagnetic actuator according to this invention may be characterized in that a cross-sectional area of the outer yoke is larger than a cross-sectional area of the magnetic pole piece.

The electromagnetic actuator according to this invention may be characterized in that the outer yoke formed of the stainless steal is painted.

The electromagnetic actuator according to this invention may be characterized in that the outer yoke is formed of an iron material and painted.

The electromagnetic actuator according to this invention may be characterized by including a spacer that is in a shape of a ring and closely attached to an end surface of the second coil holding portion at a root of the magnetic pole piece on the bottom yoke side, for positioning and securing the bobbin coil.

The electromagnetic actuator according to this invention may be characterized in that the bobbin coil includes a power receiving unit that supplies power to the second coil holding portion. The power receiving unit may be placed in a connection space created between the second coil holding portion and the bottom yoke.

The electromagnetic actuator according to this invention may be characterized in that the power receiving unit includes a terminal block and two terminal pins that are mounted on the terminal block.

The electromagnetic actuator according to this invention may be characterized in that the two terminal pins are joined and connected, respectively, with the bobbin coil at a winding start portion and a winding end portion by soldering, etc. that melts a film of the coil.

The electromagnetic actuator according to this invention may be characterized in that the second coil holding portion includes a hanging portion formed on an outer surface, on which a coil end extending over to the terminal pins is hung.

The electromagnetic actuator according to this invention may be characterized by including an auxiliary sucking portion that is formed at an end portion of the magnetic pole piece on the opposite side to the bottom yoke to increase an area of the end portion.

The electromagnetic actuator according to this invention may be characterized in that the auxiliary sucking portion is formed of a ring-shaped magnetic material or a disk-shaped magnetic material.

The electromagnetic actuator according to this invention may be characterized in that a relation $La > 2Lg$ is satisfied where $La$ represents a distance between an outside diameter of the auxiliary sucking portion and an(the?) inside diameter of the outer yoke, and $Lg$ represents a gap between the movable plate and one of the auxiliary sucking portion and the magnetic pole piece.

The electromagnetic actuator according to this invention may be characterized in that the magnetic pole piece, the bottom yoke, and the outer yoke are separate piece parts.

The electromagnetic actuator according to this invention may be characterized in that the magnetic pole piece and the bottom yoke are formed into one piece part when the magnetic pole piece and the bottom yoke are formed of a same material and the outer yoke is formed of a different material.

The electromagnetic actuator according to this invention may be characterized in that the bottom yoke and the outer yoke are formed into one piece part when the bottom yoke and the outer yoke are formed of a same material and the magnetic pole piece is formed of a different material.

The electromagnetic actuator according to this invention may be characterized in that the magnetic pole piece, the bottom yoke and the outer yoke are formed into one piece part when the magnetic pole piece, the bottom yoke and the outer yoke are formed of a same material.

Effects of the Invention

According to an electromagnetic actuator of this invention, an outer yoke that touches a corrosive liquid is made resistant to, corrosion. Furthermore, the electromagnetic actuator has a waterproof structure with a proof plate provided at an end portion of a magnetic pole piece on a movable plate side, by injecting a resin into a gap between the outer yoke and the waterproof plate. This may prevent corrosion. Thus, the electromagnetic actuator may be allowed to reduce its size with high suction power.

BEST MODE FOR IMPLEMENTING THE INVENTION

Embodiment 1

A first embodiment is described with reference to FIG. 1 to FIG. 6. FIG. 1 illustrates a longitudinal section of an electromagnetic actuator 50. FIG. 2 illustrates a transverse section of the electromagnetic actuator 50 where a bobbin coil 2 is not shown. FIG. 3 illustrates a longitudinal section of an iron core where a ring-shaped auxiliary sucking portion 20 is additionally attached to a magnetic pole piece 1. FIG. 4 illustrates a longitudinal section of an iron core where a disk-shaped auxiliary sucking portion 20 is additionally attached to the magnetic pole piece 1. FIG. 5 illustrates a longitudinal section of the electromagnetic actuator 50 having a waterproofing portion formed by a waterproof cap 30. FIG. 6 illustrates a longitudinal section of the electromagnetic actuator 50 having a movable plate storage portion 16b formed on a metal case 16.

As shown in FIG. 1, the electromagnetic actuator 50 has a magnetic pole piece 1 of a circular cylindrical shape (an example of a pillar shape) approximately at the center.

The circular cylindrical magnetic pole piece 1 is surrounded by the bobbin coil 2 that is formed by a coil 4 wound around a bobbin 3. The bobbin 3 is formed to have a first coil holding portion 3a (on a waterproof plate 9 side, which will be introduced later) and a second coil holding portion 3b (on a bottom yoke 5 side, which will be introduced later) on both ends, respectively, to hold the coil 4.

The bobbin coil 2 is surrounded by an outer yoke 6 of a cylindrical shape (an example of a tubular shape). The outer yoke 6 is formed to have a stepped portion 6a on the outer surface with a reduced diameter on a movable plate 12 side, which will be introduced later.

The bottom yoke 5 connects together the magnetic pole piece 1 and the outer yoke 6 at one end (on a large diameter side). With the example of FIG. 1, the bottom yoke 5 is integrated into the magnetic pole piece 1. The bottom yoke 5 is formed to include a lead wire outlet portion 7 on a periphery side to let a lead wire out from the bobbin coil 2.

The magnetic pole piece 1 is provided with a waterproof portion 8 at an end portion on an opposite side to the bottom yoke 5 (on a suction surface side). The waterproof portion 8, which will be introduced later, is formed to include the waterproof plate 9 and a resin 10.

The disk-shaped movable plate 12 is placed facing an end surface of the waterproof plate 9 in the waterproof portion 8 with a gap 11 in between.

A cup-shaped movable plate storage cap 13 is provided to store the movable plate 12. The movable plate storage cap 13 is fitted to the outer surface of the outer yoke 6 on the reduced diameter side, and also attached against an end portion of the outer yoke 6 on the movable plate 12 side. This creates a space 14 between the movable plate storage cap 13 and the waterproof plate 9. The movable plate storage cap 13 is then formed to include a liquid flow inlet portion 15 (an opening) on a surface facing the waterproof plate 9.

The electromagnetic actuator 50 is incorporated into the metal case 16 (a housing of a device using corrosive liquid) having an opening 16a into which the actuator 50 is fitted on the reduced diameter side. The electromagnetic actuator 50 is hermetically sealed and firmly fixed at the opening 16a of the metal case 16 by press fitting, shrink fitting, adhesive fitting, or any combinations of those fittings. The electromagnetic actuator 50 serves to act as a sealing plug for the metal case 16.

The metal case 16 is filled with a corrosive liquid 17. The electromagnetic actuator 50 is brought into contact with the corrosive liquid on the reduced diameter side (outer surface) from the border of the stepped portion 6a.

As described earlier, the electromagnetic actuator 50 is formed to have the stepped portion 6a on the outer surface so that the diameter of the suction surface side is reduced. The insertion of the electromagnetic actuator 50 into the metal case 16 on the reduced diameter side through the opening 16a may result in ensuring the positioning and securing of the electromagnetic actuator 50.

The magnetic pole piece 1 and the outer yoke 6 are formed of magnetic materials of different properties. The magnetic pole piece 1 that generates primary magnetic flux may be formed of an iron material with high permeability, such as a carbon steel. The outer yoke 6, on the other hand, may be formed of a ferritic stainless steel (e.g., JIS SUS430, SUS405, SUS434, etc.) or a martensitic stainless steel (e.g., JIS SUS403, SUS410, etc.) that is highly resistant to corrosion with permeability lower than the magnetic pole piece 1.

The outer yoke 6 thus formed with permeability lower than the magnetic pole piece 1 may allow for sufficient suction power while preventing the increase of inductance, and improving the rising characteristic of an electric current. This may also allow the electromagnet actuator 50 to be highly corrosion resistant for use in a specific environment such as in a corrosive liquid.

As shown in FIG. 2, the outer yoke 6 is formed to make a cross-sectional area S2 of a magnetic path larger than a cross-sectional area S1 of a magnetic path of the magnetic pole piece 1. This may improve the rigidity of the electromagnetic actuator 50. This may also serve to compensate the reduction in permeability by the increase of the cross-sectional area of the outer yoke 6, thereby achieving higher suction power.

As shown in FIG. 3, the magnetic pole piece 1 may be formed with an auxiliary sucking portion 20 at an end portion on the movable plate 12 side. The auxiliary sucking portion 20 is formed of a ring-shaped magnetic material, which is a part separated from the magnetic pole piece 1. The auxiliary sucking portion 20 is secured to the magnetic pole piece 1 by press fitting, adhesive fitting, etc. With the use of the auxiliary sucking portion 20, the area of the end portion of the magnetic pole piece 1 on the movable plate 12 side becomes larger, which results in increasing the suction power of the electromagnetic actuator 50.

When a relation $La > 2Lg$ is satisfied, then the suction power of the electromagnetic actuator 50 may be increased efficiently, where La represents a distance between the outside diameter of the auxiliary sucking portion 20 and the inside diameter of the outer yoke 6, and Lg represents a gap between the end portion of the auxiliary sucking portion 20 or the magnetic pole piece 1 and the movable plate 12.

As shown in FIG. 4, the auxiliary sucking portion 20 may also be formed in the shape of a disk. The disk-shaped auxiliary sucking portion 20 is secured to the magnetic pole piece 1 at the end portion by adhesive fitting, etc. This may achieve similar effects to those of the auxiliary sucking portion 20 shown in FIG. 3.

The auxiliary sucking portion 20 may also be formed of a ring-shaped magnetic material (see FIG. 3) or a disk-shaped magnetic material (see FIG. 4), which is a separate part from the magnetic pole piece 1. Alternatively, the auxiliary sucking portion 20 may be formed into the magnetic pole piece 1.

When the auxiliary sucking portion 20 and the magnetic pole piece 1 are separate parts, they are firmly fixed to each other by press fitting, adhesive fitting, etc, thereby allowing the bobbin coil 2 to be firmly fixed.

Needless to say, but similar effects may also be obtained when the auxiliary sucking portion 20 and the magnetic pole piece 1 are formed into one piece.

When the auxiliary sucking portion 20 is a separate part, the auxiliary sucking portion 20 may be formed of a magnetic material with permeability higher than the magnetic pole piece 1, thereby allowing the electromagnetic actuator 50 to increase suction power more efficiently.

As aforementioned, the outer yoke 6 is formed of a ferritic stainless steel or a martensitic stainless steel, whose permeability is smaller than that of the magnetic pole piece 1, and which is highly resistant to corrosion. Alternatively, the outer yoke 6 may be formed of an iron material such as a carbon steel, and then painted. This may ensure the corrosion resistance of the electromagnetic actuator 50 in the corrosive liquid 17 and increase the suction power. In this case, the cross-sectional area S2 of the magnetic path of the outer yoke 6 may be made smaller than the cross-sectional area S1 of the magnetic path of the magnetic pole piece 1 in a range where magnetic saturation does not occur, thereby allowing the electromagnetic actuator 50 to be downsized.

Alternatively, the magnetic pole piece 1, the bottom yoke 5, and the outer yoke 6 may be formed of a magnetic stainless steel according to the degree of suction power required for the electromagnetic actuator 50. This may allow the electromagnetic actuator 50 to have more efficient bearing force when it is incorporated into a device using the corrosive liquid 17.

Alternatively, the magnetic pole piece 1, the bottom yoke 5, and the outer yoke 6 may also be formed of separate piece parts.

When the magnetic pole piece 1 and the bottom yoke 5 are formed of the same material, and the outer yoke 6 is formed of a different material, then the magnetic pole piece 1 and the bottom yoke 5 may be integrated into a one-piece part (see the example of FIG. 1).

When the bottom yoke 5 and the outer yoke 6 are formed of the same material, and the magnetic pole piece 1 is formed of a different material, then the bottom yoke 5 and the outer yoke 6 may be integrated into a one-piece part.

When the magnetic pole piece 1, the bottom yoke 5, and the outer yoke 6 are formed of the same material, then the magnetic pole piece 1, the bottom yoke 5, and the outer yoke 6 may be integrated into a one-piece part.

These parts may be produced easily by hammering, molding, drawing, cutting, etc. selected arbitrarily.

The use of the one-piece part of the magnetic pole piece 1 and the bottom yoke 5, the one-piece part of the bottom yoke 5 and the outer yoke 6, or the one-piece part of the magnetic pole piece 1, the bottom yoke 5, and the outer yoke 6 may allow the electromagnetic actuator 50 to be highly rigid and vibration resistant. This may also allow for the reduction in the process of assembly, thereby increasing the productivity of the electromagnetic actuator 50.

As shown in FIG. 1, the bobbin coil 2 includes the bobbin 3 and the coil 4. The bobbin 3 includes a cylindrical coil wound portion 3c around which coil is put, the first coil holding portion 3a (on the suction side), and the second coil holding portion 3b (on the bottom yoke 5 side). The first and second coil holding portions 3a and 3b are spool-shaped and placed on both ends of the coil wound portion 3c, respectively, and whose outside diameters are larger than the diameter of the coil wound portion 3c.

The coil 4 is formed by putting a wire around the coil wound portion 3c of the bobbin 3 with a predetermined number of turns in an arranged manner.

The second coil holding portion 3b on the bottom yoke 5 side of the bobbin coil 2 includes a power receiving unit 21 to supply power to the coil 4. The power receiving unit 21 is formed to include a terminal block 22 and terminal pins 23. Wire connection is done in a connection space 24 created between the second coil holding portion 3b of the bobbin 3 and the bottom yoke 5.

The terminal block 22 mounted on an end surface of the second coil holding portion 3b is incorporated into the second coil holding portion 3b. The terminal block 22 has two of the terminal pins 23 mounted thereon. A wiring start portion and a wiring end portion of the coil 4 are wrapped around the terminal pins 23, respectively. The wiring start portion and the wiring end portion of the coil 4 are joined and connected with the terminal pins 23 by soldering, etc. that melts the insulting film of the wire.

The second coil holding portion 3b is formed to include a hanging portion (not shown) on the periphery thereof. The hanging portion is used for hanging a coil end (not shown) that extends over to the terminal pins 23 from the coil 4. This makes wrapping easy. This also serves to prevent the coil end from extending outside to meet the inside diameter of the outer yoke 6.

The lead wire outlet portion 7 is a cutout or an opening formed in the vicinity of the outer surface of the bottom yoke. The lead wire outlet portion 7 may allow for an easy drawing of a lead wire (not shown) outside via the power receiving unit 21 on the bobbin coil 2.

The cutout or opening is formed in the vicinity of the outer surface of the bottom yoke 5 where the cross-sectional area is larger than that of a central portion of the bottom yoke 5, thereby ensuring a magnetic path for acquiring suction power. This may prevent a reduction in suction power caused by magnetic saturation.

A spacer 25 of a ring shape is applied at the root of the magnetic pole piece 1 (on the bottom yoke 5 side). The bobbin coil 2 is positioned and secured by the spacer 25 closely attached to the end surface of the second coil holding portion 3b. The ring-shaped spacer 25 may be formed of any material with sufficient rigidity, such as a magnetic material or a nonmagnetic material. The spacer 25 may be formed of an iron material such as a carbon steel, a magnetic stainless steel, etc. This may make the spacer 25 act as a magnetic path when the power is applied. This may result in reducing magnetic flux density at the root of the magnetic piece 1 of large magnetic flux density, which may be effective for increasing suction power.

The ring-shaped spacer 25 may alternatively be integrated into the magnetic pole piece 1 to form a one-piece part. Still alternatively, the spacer 25 may be integrated into the second coil holding portion 3b of the bobbin coil to form a one-piece part. These alternatives may serve to reduce the number of parts required.

The waterproof portion 8 is formed to include the waterproof plate 9 and the resin 10. The magnetic pole piece 1 is extended out of the end surface of the bobbin 3, and the end surface of the outer yoke 6 is extended out of the end surface of the magnetic pole piece 1. The waterproof plate 9 in a shape of a disk is nonmagnetic, the inside diameter of which is smaller in size than the inside diameter of the outer yoke 6. The waterproof plate 9 is formed so that it touches the end surface of the magnetic pole piece 1. Then, a gap 27 is created between the outer yoke 6 and the waterproof plate 9 on the suction surface side. The gap 27 is filled with the resin 10 for preventing the corrosive liquid 17 from entering the inside of the electromagnetic actuator 50. Injection, insert molding, etc. may be used as a method of filling the resin 10 in the waterproof plate 9. The waterproof plate 9 and the resin 10 form the waterproof portion 8.

Possible materials for the resin 10 may include: polybutylene terephthalate (PBT), polyphenylene sulfide (PPS), liquid crystalline polymer (LCP), polyethylene terephthalate (PET), ABS resin, nylon resin, UV resin, etc. The waterproof plate 9 may be formed easily by punching a thin plate.

The example of FIG. 1 includes, but not limited to, the waterproof portion 8 where the gap 27 on the suction surface side is filled with the resin 10. The surface of the electromagnetic actuator 50 may be molded all over with resin on a stator side, for example, which may make the electromagnetic actuator 50 highly resistant to corrosion. In this particular case, the waterproof portion 8 is not required.

The waterproof portion may alternatively be formed to include the waterproof cap 30, instead of the waterproof plate 9 and the resin 10, fitted on the suction surface side, as shown in FIG. 5. Possible materials for the waterproof cap 30 may include an austenitic stainless steel (e.g., JIS SUS304, SUS301, etc) that is nonmagnetic and highly corrosion resistant. The waterproof cap 30 may be fitted on the suction surface side by shrink fitting, press fitting, adhesive fitting, etc. It is easy to produce the waterproof cap 30 by drawing, etc. The outer yoke 6 may be formed almost like the waterproof cap 30 on the reduced diameter side from the stepped portion 6a so as to function as the waterproof cap 30. This may result in reducing the number of parts required.

The movable plate storage cap 13 is formed to include the liquid flow inlet portion 15 formed with an opening on the end surface facing the movable plate 12. The movable plate storage cap 13 is filled with the corrosive liquid 17 inside.

With FIG. 1, the outside diameter of the movable plate 12 is smaller in size than the inside diameter of the movable plate storage cap 13, and also smaller than the inside diameter of the outer yoke 6. Alternatively, the outside diameter of the movable plate 12 may be made smaller in size than the inside diameter of the movable plate storage cap 13, but larger than the inside diameter of the outer yoke 6. Then, the following advantages may be achieved: that is, the movable plate 12 is allowed to move inside the movable plate storage cap 13, and suction power applied between the end surface of the outer yoke 6 and the movable plate 12 is improved (because the gap between the end surface of the outer yoke 6 and the movable plate 12 becomes small). This may result in increasing suction power.

Possible materials for the movable plate storage cap 13 may include an austenitic stainless steel (e.g., JIS SUS304, SUS301, etc) that is nonmagnetic and highly corrosion resistant.

The electromagnetic actuator 50 thus formed may achieve high corrosion resistance without losing the suction power.

An austenitic stainless steel may further improve resistance to corrosion by adding painting such as spray painting, electrostatic painting, electrophoretic painting, powder painting, etc.

When power is supplied to the receiving end portion 21 from an external power source, the electric current flows through the coil 4 to cause magnetic flux to occur. A magnetic path is then formed by the magnetic pole piece 1, the bottom yoke 5, the outer yoke 6, and the movable plate 12 formed of magnetic materials. Suction power then occurs between the end surface of the magnetic pole piece 1 and the movable plate 12, thereby sucking the movable plate 12 in the corrosive liquid 17.

In this circumstance, the corrosive liquid 17 works as a dumper, which may serve to absorb impact caused by the suction of the movable plate 12.

When no power is supplied, suction power does not occur. In this circumstance, the movable plate 12 floats in the liquid 17. This may protect the electromagnetic actuator 50 from abrasion for external vibration applied. Hence, the electromagnetic actuator 50 may be produced with excellent durability.

With FIG. 1 and FIG. 5, the movable plate storage cap 13 is fitted to the outer yoke 6 in order to store the movable plate 12. Alternatively, however, the movable plate storage portion 16b may be formed on the metal case 16 in replacement of the movable plate storage cap 13, as shown in FIG. 6. In this case, the movable plate storage cap 13 may be replaced by a rustproof magnetic stainless steel cap 40. The rustproof cap 40 is formed by extending the movable plate storage cap 13 up to the end surface of the outer yoke 6. This may allow the electromagnetic actuator 50 to have even higher suction power with the corrosion resistance maintained.

All parts of the electromagnetic actuator 50, other than the magnetic pole piece 13 and the rustproof cap 40, may be commonly used. Therefore, all that is needed is to selectively switch the manufacturing process between the magnetic pole piece 13 and the rustproof cap 40. This may allow for automated production, and thereby the electromagnetic actuator 50 may be produced with high productivity.

Figure 1:
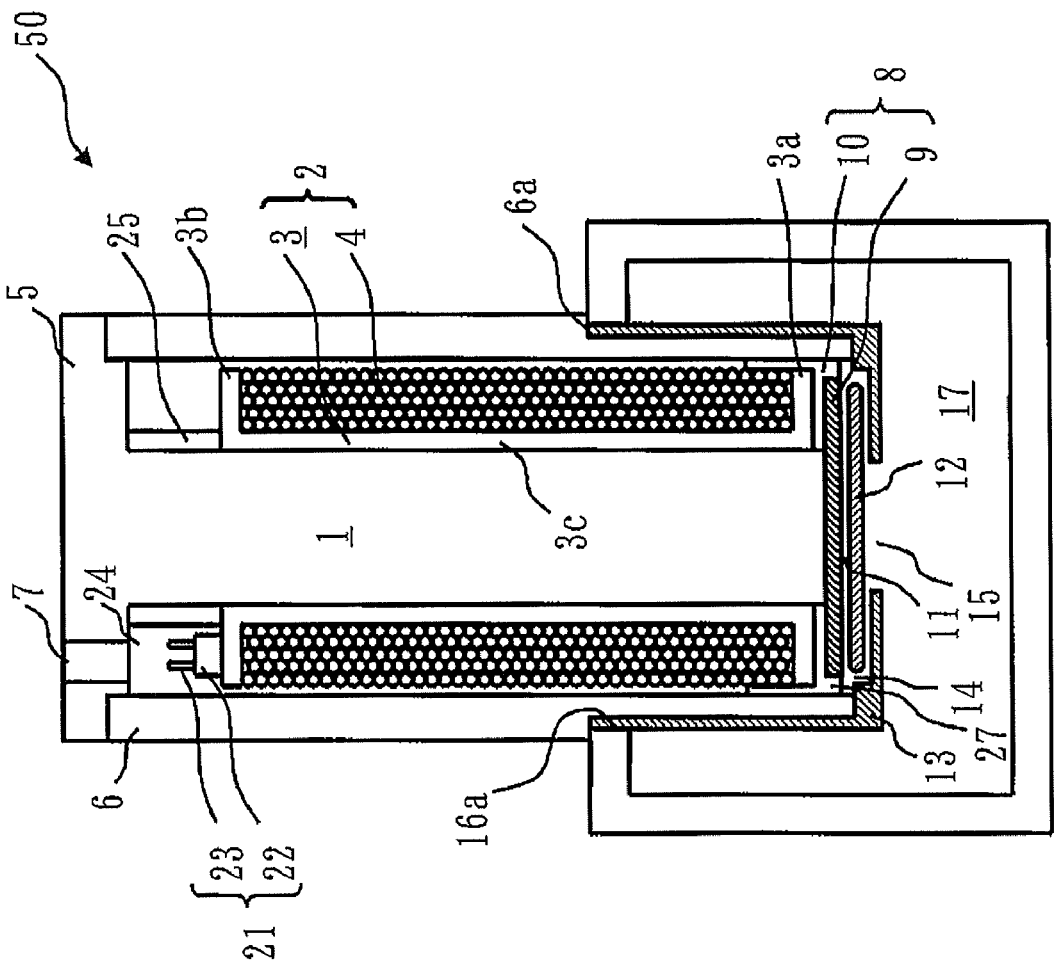
FIG. 1 The figure illustrates a longitudinal section of an electromagnetic actuator 50, according to a first embodiment.
Figure 2:
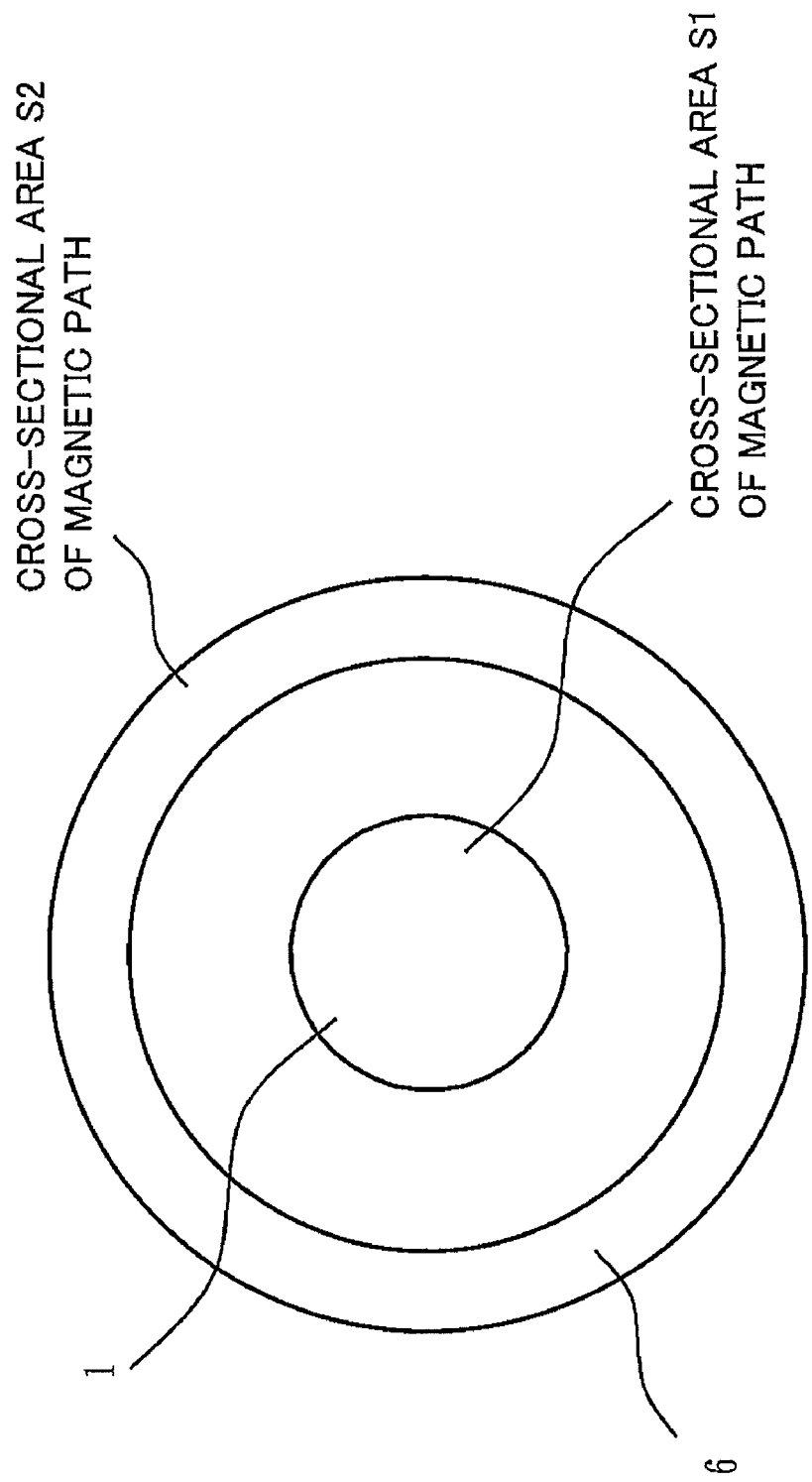
FIG. 2 The figure illustrates a transverse section of the electromagnetic actuator where a bobbin coil 2 is not shown, according to the first embodiment.
Figure 3:
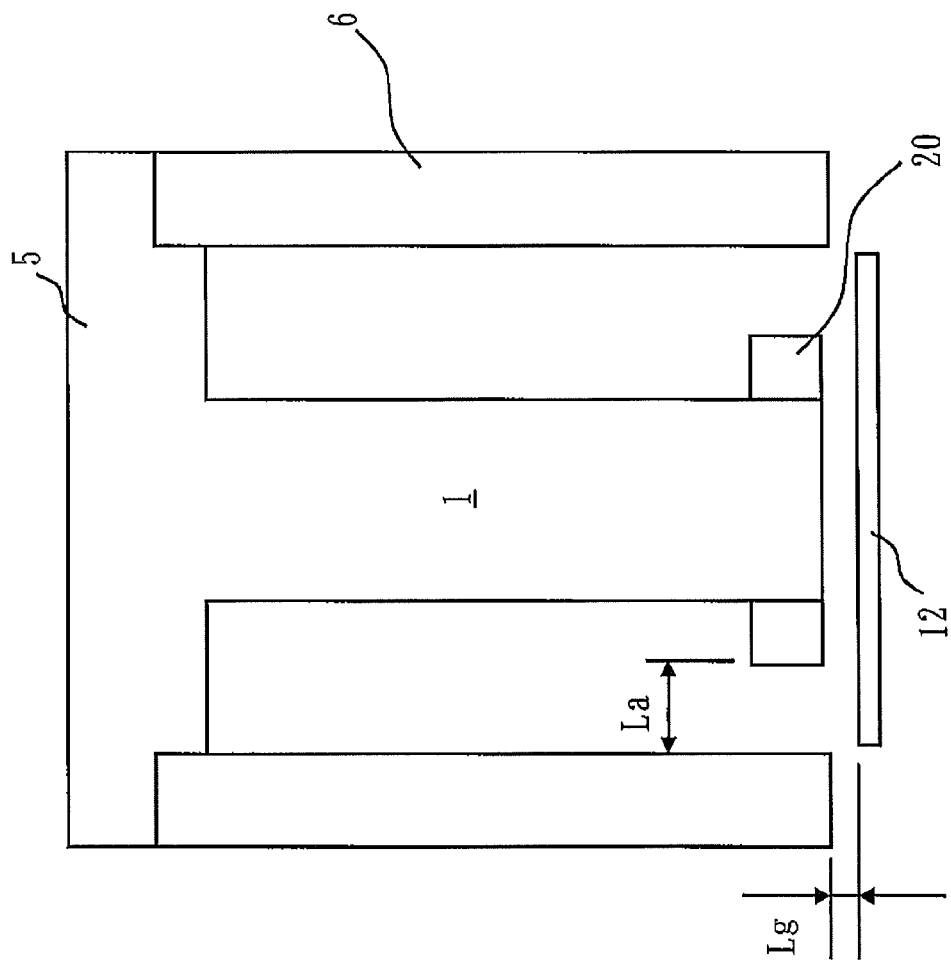
FIG. 3 The figure illustrates a longitudinal section of an iron core where a ring-shaped auxiliary sucking portion 20 is additionally attached to a magnetic pole piece 1, according to the first embodiment.
Figure 4:
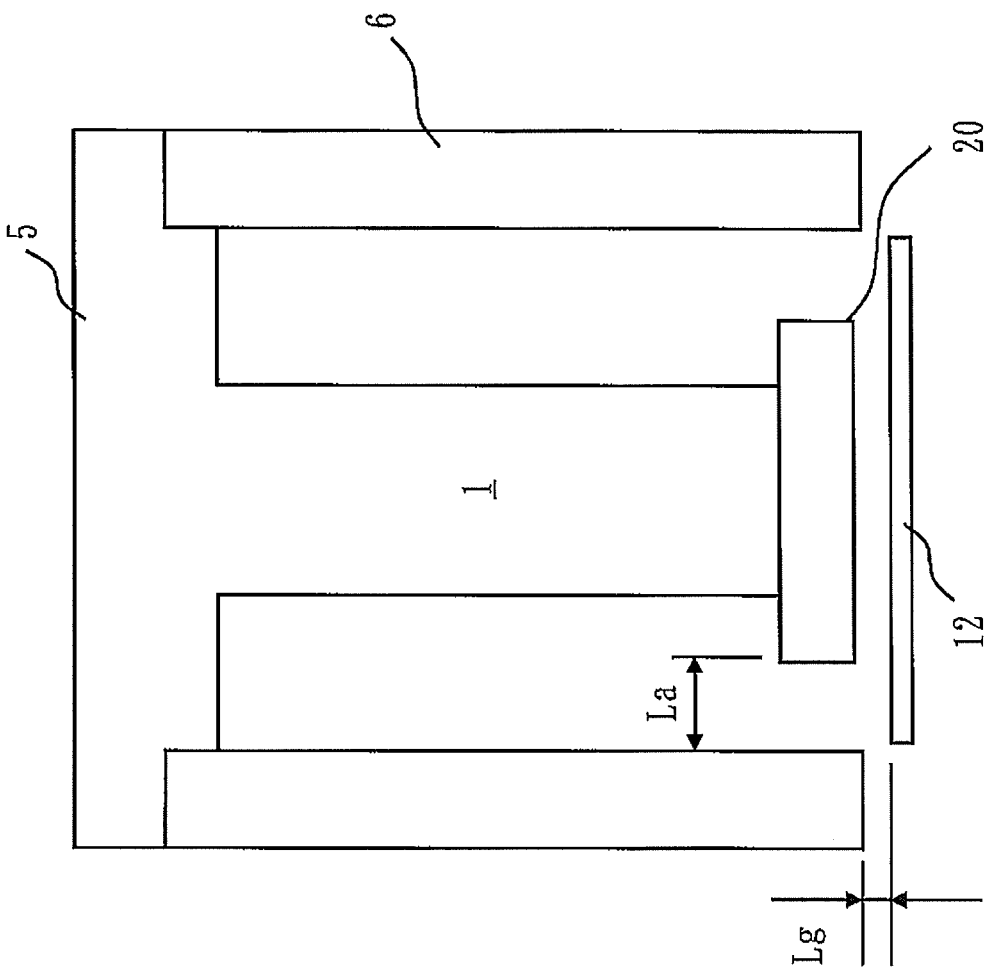
FIG. 4 The figure illustrates a longitudinal section of an iron core where a disk-shaped auxiliary sucking part 20 is additionally attached to the magnetic pole piece 1, according to the first embodiment.
Figure 5:
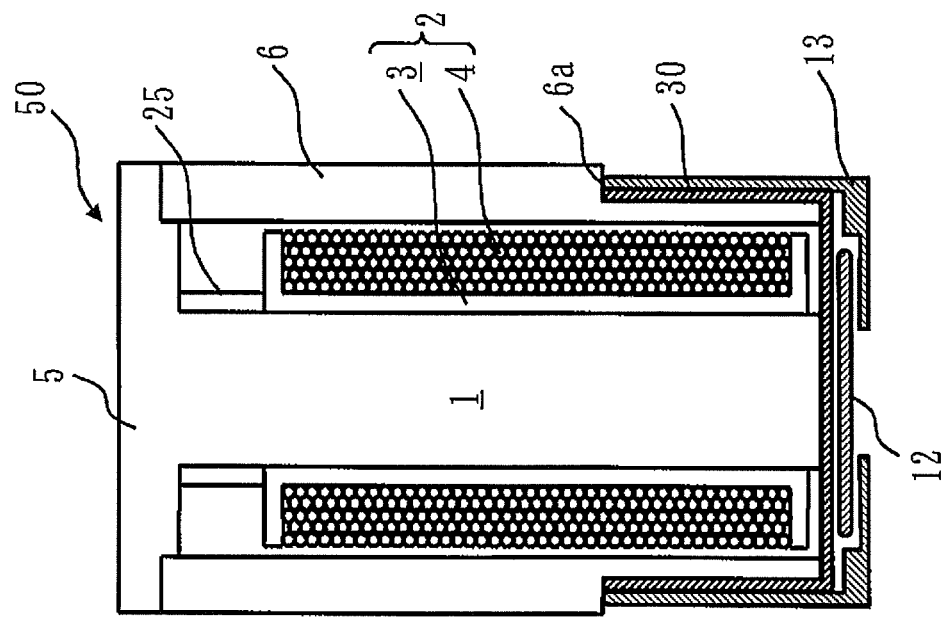
FIG. 5 The figure illustrates a longitudinal section of the electromagnetic actuator 50 including a waterproofing portion formed with a waterproof cap 30, according to the first embodiment.
Figure 6:
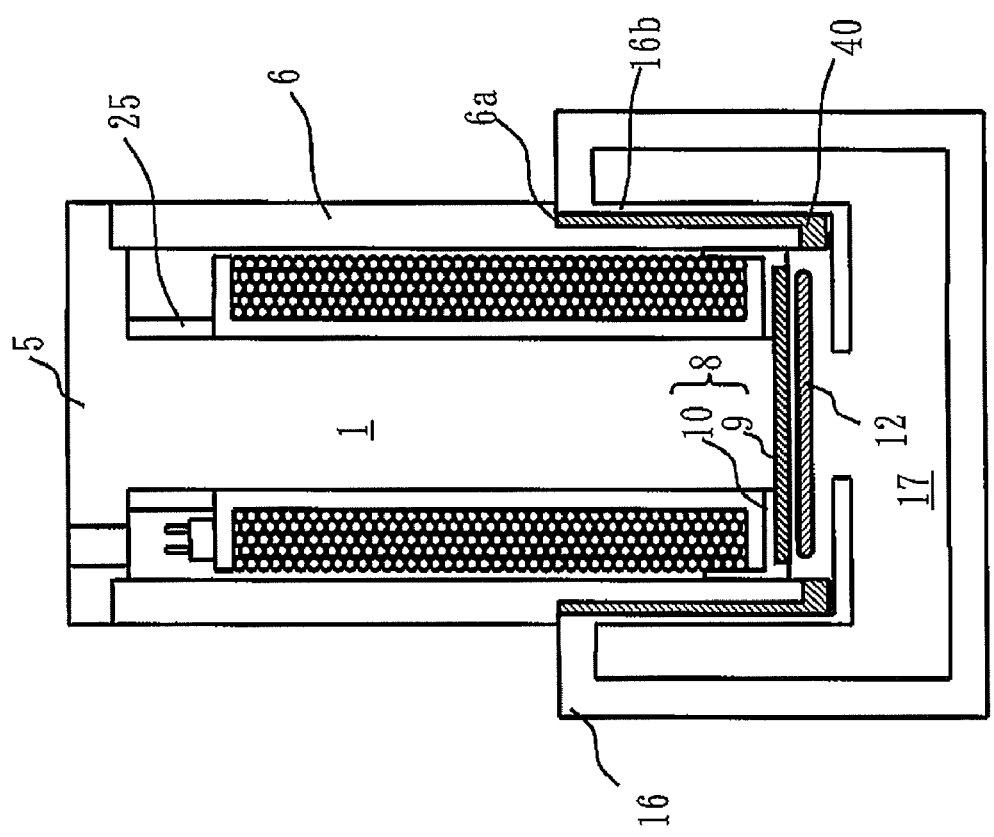
FIG. 6 The figure illustrates a longitudinal section of the electromagnetic actuator 50 where a movable plate storage portion 16b is formed on a metal case 16, according to the first embodiment.

EXPLANATION OF REFERENCE NUMERALS 1 magnetic pole piece
2 bobbin coil
3 bobbin
3a first coil holding portion
3b second coil holding portion
4 coil
5 bottom yoke
6 outer yoke
6a stepped portion
7 lead wire outlet portion
8 waterproof portion
9 waterproof plate
10 resin
11 gap
12 movable plate
13 movable plate storage cap
14 space
15 liquid flow inlet portion
16 metal case
16a opening
17 liquid
20 auxiliary sucking portion
21 power receiving unit
22 terminal block
23 terminal pin
24 connection space 25 spacer
27 gap
30 waterproof cap
40 rustproof cap
50 electromagnetic actuator

The invention claimed is:

1. An electromagnetic actuator, which is incorporated into a device using a corrosive liquid, comprising:
   a magnetic pole piece in a shape of a pillar;
   an outer yoke in a shape of a tube that is corrosion resistant, and that is placed around a periphery of the magnetic pole piece;
   a bottom yoke that connects the magnetic pole piece and one end portion of the outer yoke;
   a bobbin coil that is attached to the magnetic pole piece, the bobbin coil including a first coil holding portion, and a second coil holding portion on a bottom yoke side;
   a stepped portion that is formed on an outer surface of the outer yoke to make a diameter on an opposite side to the bottom yoke smaller than a diameter on the bottom yoke side;
   a waterproof portion that prevents the corrosive liquid from entering at least where the bobbin coil and the magnetic pole piece are;
   a movable plate that is placed in the corrosive liquid to form a magnetic circuit together with the magnetic pole piece, the outer yoke, and the bottom yoke,
   wherein the movable plate is stored in a space into which the corrosive liquid flows from the device using the corrosive liquid, the space being separated from at least the bobbin coil and the magnetic pole piece by the waterproof portion and being created either inside the electromagnetic actuator, or between the device using the corrosive liquid and the electromagnetic actuator, and
   wherein the outer yoke is incorporated into the device using the corrosive liquid, on a reduced diameter side from the stepped portion.

2. The electromagnetic actuator of claim 1, wherein the waterproof portion includes a waterproof cap in a shape of a cap that is fitted to the outer surface of the outer yoke on the reduced diameter side, and attached against another end portion of the outer yoke and an end portion of the magnetic pole piece on the opposite side to the bottom yoke,
   the electromagnetic actuator further comprising:
   a movable plate storage cap in a shape of a cup that is fitted to an outer surface of the waterproof cap to create said space between the waterproof cap and the movable plate storage cap, and formed to create an opening on a surface facing the end portion of the magnetic pole piece on the opposite side to the bottom yoke.

3. The electromagnetic actuator of claim 1, wherein the waterproof portion includes a waterproof plate that is attached against an end portion of the magnetic pole piece on an opposite side to the bottom yoke, and formed to create a gap between the first coil holding portion and an inner surface of the outer yoke,
   the electromagnetic actuator further comprising:
   a rustproof cap in a shape of a cup that is fitted to the outer surface of the outer yoke on the reduced diameter side, and attached against another end portion of the outer yoke, and formed to include an opening whose diameter is approximately same in size as an inside diameter of the outer yoke,
   wherein said space is created in a lower portion of the waterproof plate between the device using the corrosive liquid and the electromagnetic actuator.

4. The electromagnetic actuator according to claim 1, wherein the magnetic pole piece and the bottom yoke are formed of an iron material, and the outer yoke is formed of a stainless steel.

5. The electromagnetic actuator according to claim 4, wherein a cross-sectional area of the outer yoke is larger than a cross-sectional area of the magnetic pole piece.

6. The electromagnetic actuator according to claim 4, wherein the outer yoke formed of the stainless steel is painted.

7. The electromagnetic actuator according to claim 1, wherein the outer yoke is formed of an iron material and painted.

8. The electromagnetic actuator according to claim 1 further comprising:
   a spacer in a shape of a ring that is closely attached to an end surface of the second coil holding portion at a root of the magnetic pole piece on the bottom yoke side, for positioning and securing the bobbin coil.

9. The electromagnetic actuator according to claim 8, wherein the bobbin coil includes a power receiving unit that supplies power to the second coil holding portion, and
   wherein the power receiving unit is placed in a connection space that is created between the second coil holding portion and the bottom yoke.

10. The electromagnetic actuator according to claim 9, wherein the power receiving unit includes a terminal block and two terminal pins that are mounted on the terminal block.

11. The electromagnetic actuator according to claim 10, wherein the two terminal pins are joined and connected, respectively, with the bobbin coil at a winding start portion and a winding end portion by soldering, etc. that melts a film of the coil.

12. The electromagnetic actuator according to claim 10, wherein the second coil holding portion includes a hanging portion formed on an outer surface, on which a coil end extending over to the terminal pins is hung.

13. The electromagnetic actuator according to claim 1 further comprising:
   an auxiliary sucking portion that is formed at an end portion of the magnetic pole piece on the opposite side to the bottom yoke to increase an area of the end portion.

14. The electromagnetic actuator according to claim 13, wherein the auxiliary sucking portion is formed of one of a ring-shaped magnetic material and a disk-shaped magnetic material.

15. The electromagnetic actuator according to claim 13, wherein a relation $La > 2Lg$ is satisfied where $La$ represents a distance between an outside diameter of the auxiliary sucking portion and an inside diameter of the outer yoke, and $Lg$ represents a gap between the movable plate and one of the auxiliary sucking portion and the magnetic pole piece.

16. The electromagnetic actuator according to claim 1, wherein the magnetic pole piece, the bottom yoke, and the outer yoke are separate piece parts.

17. The electromagnetic actuator according to claim 1, wherein the magnetic pole piece and the bottom yoke are formed into one piece part when the magnetic pole piece and the bottom yoke are formed of a same material and the outer yoke is formed of a different material.

18. The electromagnetic actuator according to claim 1, wherein the bottom yoke and the outer yoke are formed into one piece part when the bottom yoke and the outer yoke are formed of a same material and the magnetic pole piece is formed of a different material.

19. The electromagnetic actuator according to claim 1, wherein the magnetic pole piece, the bottom yoke and the outer yoke are formed into one piece part when the magnetic pole piece, the bottom yoke and the outer yoke are formed of a same material.

20. An electromagnetic actuator comprising:

a magnetic pole piece in a shape of a pillar;

an outer yoke in a shape of a tube that is corrosion resistant, and that is placed around a periphery of the magnetic pole piece;

a bottom yoke that connects the magnetic pole piece and one end portion of the outer yoke;

a bobbin coil that is attached to the magnetic pole piece, the bobbin coil including a first coil holding portion, and a second coil holding portion on a bottom yoke side;

a waterproof plate that is attached against an end portion of the magnetic pole piece on an opposite side to the bottom yoke, and formed to create a gap among the first coil holding portion, an inner surface of the outer yoke and the waterproof plate;

a stepped portion that is formed on an outer surface of the outer yoke to make a diameter on the opposite side to the bottom yoke smaller than a diameter on the bottom yoke side;

a movable plate storage cap in a shape of a cup that is fitted to the outer surface of the outer yoke on a reduced diameter side, attached against another end portion of the outer yoke to create a space between the waterproof plate and the movable plate storage cap, and formed to create an opening on a surface facing the waterproof plate;

a movable plate that is placed in the space between the waterproof plate and the movable plate storage cap; and a resin that is filled in a gap formed between the outer yoke and the waterproof plate, wherein the reduced diameter side from the stepped portion is incorporated into the device using the corrosive liquid.

\* \* \* \* \*

UNITED STATES PATENT AND TRADEMARK OFFICE
CERTIFICATE OF CORRECTION

PATENT NO. : 8,305,176 B2  
APPLICATION NO. : 12/674214  
DATED : November 6, 2012  
INVENTOR(S) : Kazuhiko Baba et al.

Page 1 of 1

It is certified that error appears in the above-identified patent and that said Letters Patent is hereby corrected as shown below:

Title Page, Section (75) Inventors: First inventor, please change "Kazuhikio Baba" to --Kazuhiko Baba--.

Signed and Sealed this  
Nineteenth Day of February, 2013

Teresa Stanek Rea  
*Acting Director of the United States Patent and Trademark Office*